May 30, 1933.  A. M. SQUICCIARINI  1,912,315

DECORATIVE DEVICE

Filed Sept. 29, 1931

WITNESSES

INVENTOR
Arcangelo M. Squicciarini
BY
ATTORNEY

Patented May 30, 1933

1,912,315

UNITED STATES PATENT OFFICE

ARCANGELO M. SQUICCIARINI, OF BROOKLYN, NEW YORK

DECORATIVE DEVICE

Application filed September 29, 1931. Serial No. 565,839.

This invention relates to a decorative or ornamental device to lend beauty to the household and other places.

While the finished product or device of the present invention is decorative or ornamental, utility exists in certain structural features thereof which make it possible to produce a novel and durable device as well as an artistic, decorative and ornamental one.

The invention contemplates a device of the indicated character embodying structural futures making it possible to obtain artificial floral pieces appearing as though in a basket or the like, and other forms or figures simulating natural and inanimate objects.

With the foregoing, other objects of the invention will appear from the embodiment of the invention which by way of example is described in the following specification and illustrated in the accompanying drawing, in which Figure 1 is a front view of a device embodying the invention;

Figure 1:
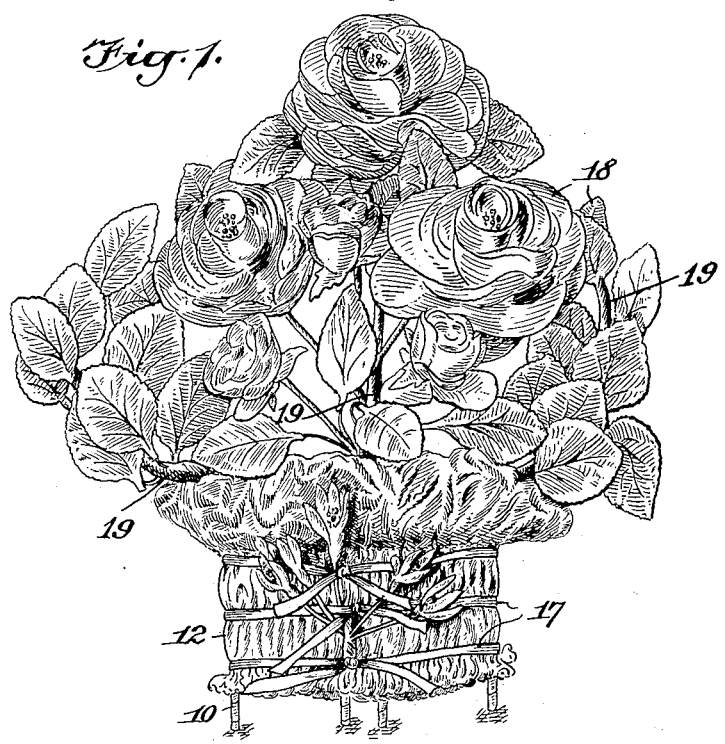
Figure 2:
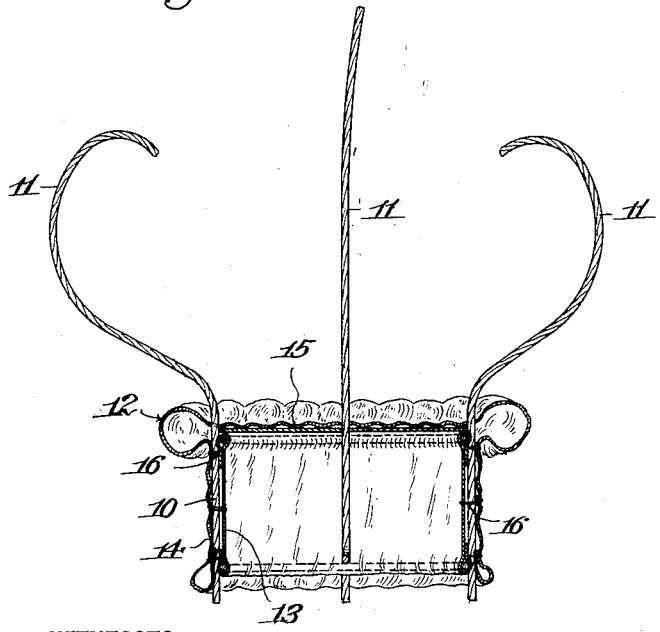
Figure 2 is a sectional view of the supporting frame structure or base of the device, the said frame being partly covered in accordance with the invention.
Figure 3:
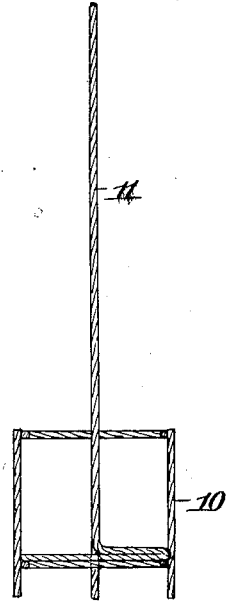
Figure 3 is a transverse section of the supporting frame structure or base.

Referring now more particularly to the drawing, it will be apparent that the device includes a supporting frame or base 10 which is constructed preferably of twisted or other wire. The frame or base may be of any shape and size. Applied to the frame or base 10 are any suitable number and arrangement of supporting members 11 which rise from said frame or base. The frame 10 has applied thereto an enclosing structure 12 consisting of fabric, preferably silk of any color. The structure 12 extends interiorly of the frame as at 13, exteriorly thereof on the side as at 14, and also on the top thereof as at 15. The structure 12 is secured to the members of the frame in any suitable manner as by the use of thread indicated at 16, and also by ribbons 17 of silk of a color similar to that of the fabric of the structure 12 or in contrasting color. The ribbons 17 are placed about the structure 12 in an artistic manner, as shown most clearly in Figure 1.

Applied to the members 11 are objects 18, such as artificial flowers, buds and leaves. Strips of silk are wrapped on the members 11 and thus form the large stems 19 for the flowers and leaves to which they are attached by the wrapped strips. It will now be apparent that the finished device will have the appearance of a basket of flowers, as shown in Figure 1. The device will be of substantial decorative and artistic design and of durable construction.

It is obvious that forms and figures of natural and inanimate objects other than the flowers and leaves may be provided in lieu thereof or in addition thereto.

I claim:

1. A device of the class described, comprising a frame structure, supporting members secured to and projecting from the frame structure, a fabric structure covering the frame structure, artificial objects, and means securing said objects to said supporting members above said frame structure.

2. A device of the class described, comprising a frame structure, supporting members secured to and projecting from the frame structure, a fabric structure covering the frame structure, artificial objects, and means securing said objects to said supporting members, said means including a fabric covering on said supporting members.

3. A decorative device, comprising a frame structure, a fabric structure covering the frame structure and both structures simulating a covered basket, supporting members secured to and projecting upwardly from the frame structure, artificial flowers and leaves, and means securing said flowers and leaves to said supporting members above said frame structure.

4. A device of the class described, comprising a frame structure constructed of wire, supporting members secured to and projecting from the frame structure, a fabric structure covering the frame structure on the inside and outside thereof, artificial objects, and fabric means covering said supporting members and securing said objects thereto.

5. A decorative device, comprising a frame structure, a fabric structure covering the frame structure and both structures simulating a covered basket, supporting members secured to and projecting upwardly from the frame structure, artificial flowers and leaves, and means securing said flowers and leaves to said supporting members above said frame structure, and said means consisting of a covering material on said supporting members forming therewith the stems for said flowers and leaves.

ARCANGELO M. SQUICCIARINI.